Feb. 7, 1961   W. F. PRIDEMORE   2,970,499
SAW SHARPENING APPARATUS
Filed Aug. 14, 1957   3 Sheets-Sheet 1
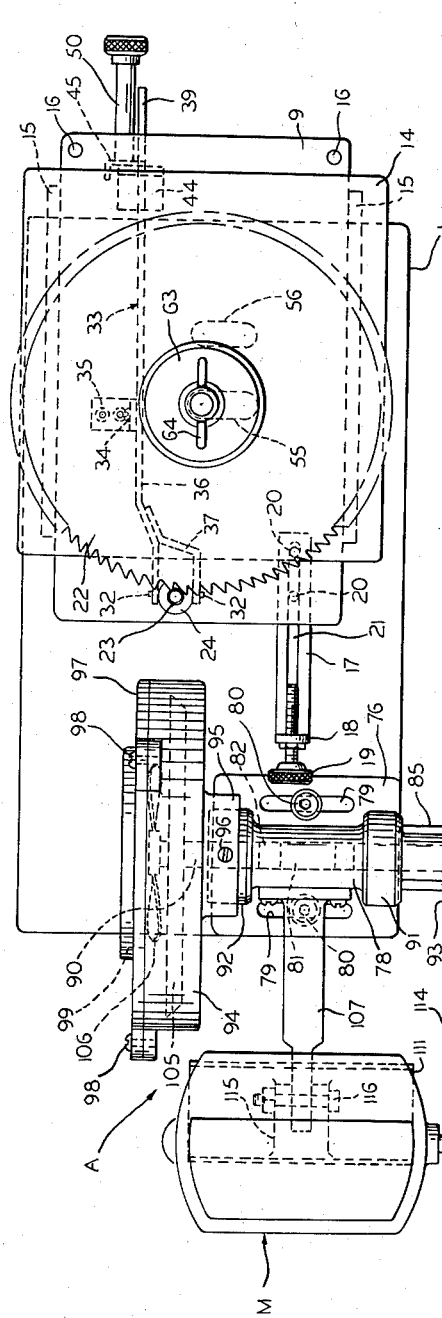
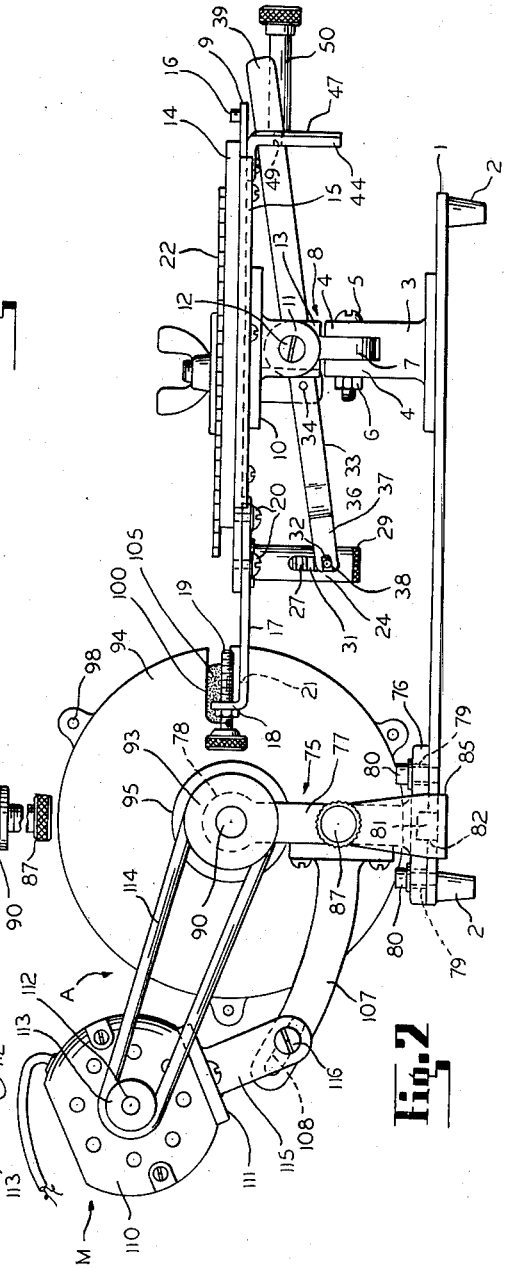
INVENTOR.
WILLIAM F. PRIDEMORE
BY
Chester W. Brown
ATTORNEY Feb. 7, 1961

W. F. PRIDEMORE 2,970,499

SAW SHARPENING APPARATUS

Filed Aug. 14, 1957

INVENTOR.
WILLIAM F. PRIDEMORE
BY
Chester W. Brown
ATTORNEY

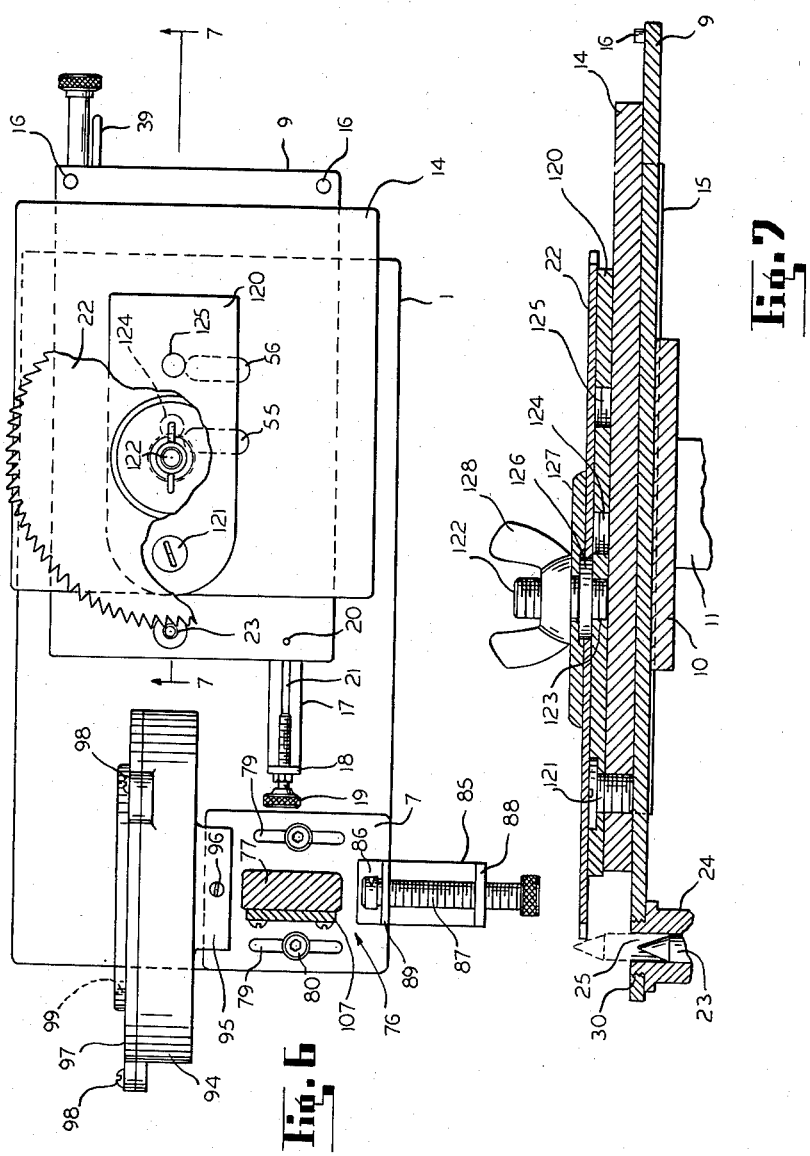

United States Patent Office 2,970,499
Patented Feb. 7, 1961

2,970,499
SAW SHARPENING APPARATUS

William F. Pridemore, 5520 N. Traymore Ave., Covina, Calif.

Filed Aug. 14, 1957, Ser. No. 678,061

11 Claims. (Cl. 76—43)

This invention relates to improvements in saw sharpening apparatus and more particularly to apparatus for sharpening circular saws.

An object of this invention is to provide a saw sharpening apparatus which may be used by the user of the saw, thus avoiding the necessity of taking the saw to a specialist for sharpening.

More specifically it is an object to provide a circular saw sharpener which may be manipulated by the saw user to sharpen the saw teeth accurately and which may be adjusted to proper angles suitable for obtaining a cutting angle on the saw teeth of a circular saw desirable for that particular saw.

To attain the objects of this invention, I have devised a portable saw sharpener which is efficient in operation, which is relatively lightweight but sturdy, which is simple in operation and which requires no special skill of the operator except careful adjustment and control.

Anther object is to provide a saw supporting table which may be manipulated with reference to a grinding wheel between a grinding position and an aligning position where the saw may be adjusted on the table to align the saw teeth successively after each grinding operation relative to the grinding wheel.

A further object is to provide a saw tooth aligning pin situated with reference to the grinding wheel and movable to a position for engagement with a saw tooth to accurately align the tooth for subsequent movement to tooth grinding position.

It is also an object to provide a detachable swingable saw support on a table slidable radially of the grinding wheel to obtain desired angle cutting edges on certain types of circular saws.

It is a further object to provide a saw tooth aligning pin which may be properly positioned for reference to saw teeth whether the saw is located directly on the sliding saw table or on a swingable saw table mounted on the sliding saw table.

Still another object is to provide an adjustable stop for determining the depth of the grind on each saw tooth, thus accurately grinding each saw tooth uniformly with the remaining saw teeth.

A still further object is to provide a universal mounting for the saw support which enables the user to obtain numerous angles for orienting the saw with reference to the grinding wheel and thereby choose desirable grinding angles suitable for a given saw.

It is still another object to provide a power driven grinding wheel which may be adjusted laterally with reference to the sliding plane of the saw table to obtain accurate alignment of the grinding wheel with reference to the saw tooth aligning pin and subsequent movement of a saw tooth into engagement with the grinding wheel.

Another desirable object is the provision of a blower synchronized with the grinding wheel for drawing a stream of air radially inward of the grinding wheel at the point of contact of a saw tooth and expelling the air axially of the wheel, thereby removing all abraded materials and preventing its deposit on the saw supporting structure.

Other objects and advantages of my invention will become apparent from the following description of the drawings, in which Fig. 1 is a top plan view.

Fig. 2 is a view in side elevation as seen from the bottom with reference to Fig. 1.

Fig. 6 is a top plan view similar to Fig. 1 with the motor removed and illustrating a modified form of my invention.

Fig. 7 is an enlarged fragmentary sectional view taken substantially on the line 7—7 of Fig. 6.

Throughout the several views like parts are designated by the same numerals.

Figure 4:
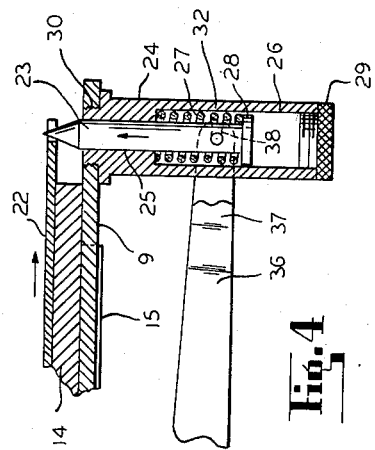
Fig. 4 is a fragmentary view illustrating the saw tooth aligning pin shown in Fig. 3 in aligning position.

The apparatus herein disclosed is mounted on an elongated portable base plate 1 having supporting legs 2. A standard 3 is fixedly mounted on the base plate 1 in a suitable manner, as by welding, and is provided with two relatively spaced parallel arms 4 which have some resiliency permitting them to be drawn toward each other by the bolt 5 and nut 6 into frictional engagement with lower arm 7 of universal 8 pivotally mounted on the bolt 5.

A table 9 which, as shown, is in substantial parallelism with the base 1 is suitably fixedly secured in any suitable manner to a depending bracket 10 having relatively spaced depending arms 11 pivotally mounted on a bolt 12 which passes through upper arm 13 on the universal 8. As indicated with reference to the universal mounting on the standard 3, it will be understood that the arms 11 have some resiliency sufficient to permit them to be drawn into frictional engagement with the upper arm 13 on the universal 8 by means of the bolt 12 and nut (not shown).

Thus it will be seen that the table 9 may be tilted angularly laterally about the bolt 5 with reference to the base or may be tilted angularly in a vertical direction about the bolt 12 with reference to the base plate 1 or may be tilted angularly about both bolts 5 and 12 to obtain other angular positions of the table 9 with reference to the base.

Although I have illustrated and described a universal mounting of the table 9 on the base 1, it will be understood that the table may be fixedly mounted on the base plate by means of a standard (not shown) extending from the base plate to the table.

Slidably mounted on the table 9 is a saw supporting plate 14 having depending spaced guide bars 15 engaging corresponding sides of the table 9 and guiding the plate 14 on the table 9 for movement in either direction longitudinally relative to the table and base plate 1.

As shown at the right with reference to Figs. 1, 2, 3, 6 and 7, the table 9 may be provided with pins 16 for limiting the sliding movement of the plate 14 in one direction. The opposite end of the table 9 is provided with an adjustable limiting stop comprising a slotted arm 17 having a vertically extending end portion 18 which threadedly receives a screw bolt 19 projecting horizontally toward and in the path of sliding movement of the saw supporting plate 14. The arm 17 is secured to the underside of the table 9 by means of set screws 20 which extend through the slot 21 and into the table. From this it will be observed that I have provided two means of adjustment, one for adjusting the arm 17 longitudinally of the table and one for adjusting the screw 19 to obtain a finer regulation of the plate movement in the direction of the screw.

Mounted beneath the table 9 for movement therethrough into a position intersecting the plane of the circular saw 22 is a saw tooth locating pin 23. As will be seen in Figs. 3 and 4, the pin 23 is housed in a tubular casing 24 having a bore 25 slidably guiding the pin and a larger bore 26 receiving a coil spring 27 surrounding the pin and engaging the upper end of the bore 26 and the annular head 28 on the lower end of the pin. The lower end of the bore 26 is closed by a removable screw plug 29. The upper end of the casing 24 is removably threaded through the table 3 at 30. The spring 27 biases the pin 23 to the normal position shown in Fig. 3.

As indicated in Fig. 2, the casing 24 is slotted vertically on opposite sides 31 to receive a pin or peg 32 which extends through the lower end of the locating pin 23 and to the exterior of the casing 24 at opposite sides thereof. For manually controlling the locating pin 23, I have provided a fulcrum lever 33 pivoted at 34 on a depending bracket 35 secured to the underside of the table 9 at 36. As viewed on Fig. 3, the right hand end 36 of the lever 33 is forked at 37 to extend to opposite sides of the casing 24. Each of the forked ends is provided with an open ended slot 38 to receive an adjacent end of the peg 32. The end 39 of the lever 33 extends to a position beyond the adjacent end of the table 9 where it may be manually manipulated.

Figure 5:
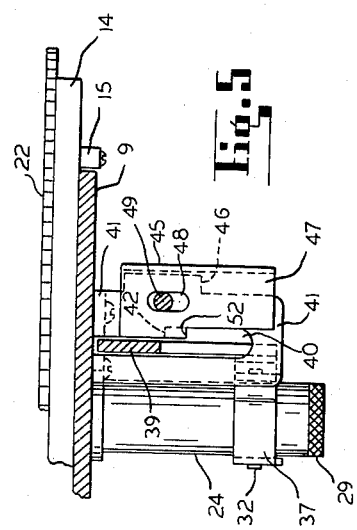
Fig. 5 is a fragmentary view partly in section taken on the line 5—5 of Fig. 4.

The end 39 of the lever 33 extends through a slot 40 in the L-shaped bracket 41 secured to the underside of the table 3 adjacent to the corresponding end 39 of the lever 33. As shown in Fig. 5 the slot 40 is wider at the lower portion to provide a latching shoulder 42, shown in dotted lines. Slidably mounted for vertical movement on the bracket 44 is a channel-like member 45 which embraces the vertical portion of the bracket and is guided by the laterally projecting portion 46 on the bracket and contacting the base of member 45. Side 47 of the member 45 is slotted at 48 to receive the threaded end 49 on the clamping rod 50. The threaded end threadedly engages the bracket 44. Thus rotation of the rod 50 in one direction forces the shouldered end 51 into clamping engagement with the member 45 and holds it in position for disposition of the shoulder 52 for latching the end 39 of the lever 33 in either of two positions corresponding to the position the locating pin 23 is to be placed in, as hereafter more fully disclosed.

Figure 3:
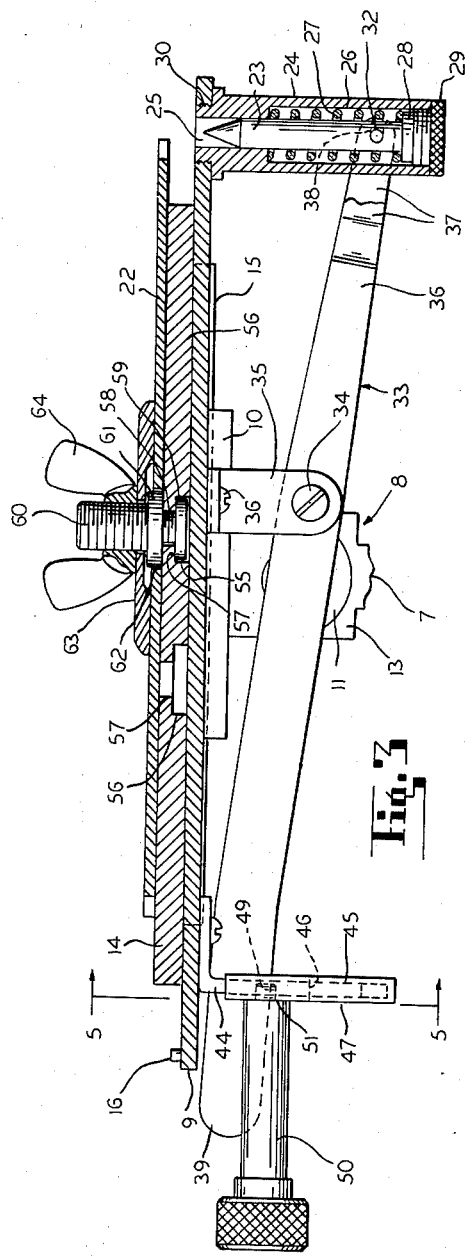
Fig. 3 is an enlarged fragmentary view partly in section showing the saw tooth aligning mechanism as viewed with reference to the top of Fig. 1.

As shown in Figs. 1, 2 and 3, the plate 14 is provided with two relatively spaced elongated apertures 55 and 56 in substantial parallelism and extending transversely to the direction of plate movement on the table 9. Each recess is under-cut to provide an annular shoulder 57. A threaded stud bolt 58, having its flanged head 59 beneath the shoulder, extends upwardly through the aperture 55 and threadedly engages the tubular combination stud and nut 60 having a flanged head 61 engaging the upper face of the plate 9. It will be evident that the stud bolt 58 may be positioned at any one of various positions within the aperture 55 and clamped in that position by means of combination stud and nut 60. Preferably the head 61 of the stud-nut 60 is substantially equal in dimension to the aperture 62 located centrally in the circular saw 22. When the saw 22 is positioned as shown on the plate 9, a lock washer 63 is mounted on the saw, as shown, and the wing nut 64 is threaded on the stud nut to clamp the saw in position after a tooth of the saw is properly oriented as hereafter more fully disclosed.

If the teeth of a circular saw of a much larger diameter than that shown are to be sharpened, the aperture 56 in the plate 9 will be utilized to clamp the saw in a manner identical to that described with reference to aperture 55.

After the plate 9 has been moved to a position allowing sufficient clearance of the pin, and after the saw has been mounted on the table 9, but before clamping to the table, the locating pin 23 will be raised to the position shown in Fig. 4 and the plate 9 with the saw thereon moved to dispose the upper end of the pin 23 at the root of adjacent teeth on the saw. When the teeth have been thus aligned, the saw is then clamped to the plate in the manner previously described. Thereafter, the pin 23 will be returned to the position shown in Fig. 3.

The grinding wheel and motor assembly A is carried on the base plate 1 by means of a bracket 75 comprising a footing 76, an upright 77 integral therewith and terminating in a bearing 78. Each wing of the footing 76 is provided with an elongated slot 79 which receives a clamping bolt 80 threaded into the base 1 for firmly anchoring the footing 76 to the base plate 1. Obviously the assembly A may be shifted in either direction transversely of the plane of sliding movement of the saw supporting plate 14. An elongated key 81 is secured in the footing 76 and projected through elongated slot 82 in the base plate paralleling the slots 79 and serves to guide the bracket 75 during lateral adjustment on the base 1 and maintains the assembly A in accurate relationship to the saw supporting table 9.

For accurate adjustment of the assembly A on the base plate 1, I have provided a main bracket 85 secured in any suitable manner to the base plate, a second bracket 86 secured in any suitable manner to the footing 76, and an adjusting screw 87 (see Fig. 6) threaded through the upright 88 on the main bracket 85 and rotatably journaled in the upright 89 on the second bracket 86.

As will be seen, shaft 90 is rotatably mounted in the bearing support 78 and extends through the support 78 to the exterior thereof at each end. The bearing support 78 is provided with ball or roller bearings (not shown) at the enlarged portions 91 and 92. At the lower end of the shaft 90 as viewed in Fig. 1, a pulley 93 is secured to and mounted on the shaft. At upper or opposite ends of the shaft, a circular housing 94 is secured to the enlarged portion 92 by means of an annular flange 95 embracing the portion 92 and a set screw 96 extending through the flange and engaging the portion 92. The upper end of the circular housing 94, as viewed in Figs. 1 and 6, is closed by a cover plate 97 by means of screw bolts 98 and is centrally apertured at 99 to permit air circulation as hereafter set forth.

Viewing Fig. 2, it will be seen that the housing 94 and cover plate 97 are notched at 100 radially of the housing to expose the grinding wheel 105 in the direction of slidable plate 14 and saw 22 to permit movement of the saw into contact with wheel 105. Details of the mounting of the grinding wheel 105 shown in broken lines in Figs. 1 and 6 are not shown since this is well known to those skilled in the art. Preferably, a fan 106, shown in broken lines, is mounted on the shaft within the housing 94 and adjacent to the opening 99 in the cover plate 97 and is designed to expel air through the opening and is drawn into the housing through the notch 100, thus preventing abraded material from accumulating in the area of the saw supporting structure.

Mounted on one side of the upright 77 on the bracket 75 is an arcuately upwardly extending motor supporting arm 107 having at its outer end an elongated slot 108. The motor M, having a casing 110 mounted on a bracket 111, is provided with a power transmitting shaft 112 and pulley 113. A belt 114 connects the pulley 113 with the pulley 93 on the shaft 90. The motor supporting bracket 111 is provided with a depending bifurcated arm 115 which embraces the arm 107 adjacent to the slot 108 therein. The bifurcated arm 115 is provided with supporting bolt 116 extending through the bifurcated end of the arm 115 and slot 108. This bolt 116 also serves to draw the bifurcated end of the arm 115 into frictional engagement with the arm 107 and thus stabilize the motor M during grinding operations and maintain a substantially constant tension on the belt 114.

As indicated by the broken lines in Fig. 1, the grinding wheel 105 is provided with beveled grinding periphery corresponding angularly to the beveled area of the saw teeth.

From the foregoing description it will be apparent that, in preparing to sharpen the saw teeth, the particular tooth to be ground will be oriented by means of the pin 23 in the manner previously described. Thereafter, the grinding wheel 105 should be shifted laterally of the base in the manner previously disclosed so that the radial face of the grinding wheel on the high side of the beveled periphery is in direct alignment with the radial edge of the tooth adjacent to the beveled face of the tooth which is to be ground.

Although I have indicated the locating pin 23 as having a conical end for contact with the saw teeth, it will be obvious that the end may be cylindrical and serve the same purpose.

The modified arrangement illustrated in Figs. 6 and 7 is basically substantially as described with reference to Figs. 1 through 5, the difference being only in the fact that an auxiliary saw support is mounted on the slide 14 as hereafter noted. In Figs. 6 and 7 the slide 14 is provided with an elongated secondary swinging plate 120 for supporting the saw 22 shown fragmentarily. Plate 120 is pivotally mounted on a clamping bolt 121 extending through plate 120 and threadedly engaging the plate 14. In this manner the swinging plate 120 may be positioned at any desired angle on the plate 14 and clamped in that position. The swinging plate 120 is provided with a stud bolt 122 which may be secured in either of the three threaded apertures 123, 124 or 125 depending upon the diameter of the saw which is to be sharpened. The flange 126 on the bolt 122 clampingly engages the swinging plate 120 and serves as a centering hub for the saw 22. As shown the stud bolt is mounted in aperture 123. When the saw is mounted as shown, a clamping washer 127 and wing nut 128 on the stud 122 are moved to clamping engagement with the saw after the tooth to be ground is properly oriented with reference to the grinding wheel 105 as previously described.

The secondary swinging plate 120 will, of course, be first placed at an angle with reference to sliding plate 14 which angle may be dictated by the type of teeth that are to be sharpened.

I have previously indicated that the locating pin 23 may be moved to either of two positions. Fig. 4 shows the pin located in one position for orienting a saw tooth when the saw is mounted directly on the sliding plate 14. When the saw is mounted on the secondary swinging plate 120, it is necessary to extend the pin 23 further from its casing 24 as indicated by the broken lines in Fig. 7. Referring now to Fig. 5, when it is desired to extend the locating pin 23, as in Fig. 7, the channel-like member 45 will be released and moved downwardly until it is placed as shown and then again clamped in position by means of the rod 50. Then the lever 33 will be operated to dispose the end 39 beneath the shoulder 52 to hold the pin 23 in the position illustrated by the broken lines in Fig. 7. Preferably the shoulders 4 and 52 on the bracket 44 and member 45, respectively should be beveled slightly inwardly and upwardly to insure that the lever end 39 will not be accidently disengaged therefrom before the saw tooth locating operations are completed.

From the foregoing it will be apparent that I have disclosed a novel portable saw sharpening apparatus, which is well adapted for use by the user of a saw and affords an apparatus which he may have at his ready command without requiring any special skill on his part, except that of knowing the type of saw to be sharpened and then adjusting the apparatus for accurately grinding the saw teeth of the particular type of saw.

I claim as my invention:

1. In combination, a portable base plate, a power driven grinding wheel mounted on said base plate for rotation in a given plane, a saw supporting structure mounted on said base plate and including saw supporting plate for supporting a saw in a plane intersecting said first mentioned plane and extending radially of the axis of said wheel, said supporting plate being movable in either of two directions radially relative to the axis of said grinding wheel, a saw tooth locating pin movably carried by said saw supporting structure and movable through said plane into saw tooth engaging position, and manually operable means carried by said support and engaged with said pin for moving said pin into and out of saw tooth locating position disposed between said saw and wheel.

2. In combination, a base, a power driven grinding wheel rotatably carried by said base, a casing enclosing said wheel and having an opening in an axial direction relative to said wheel and located substantially concentrically relative thereto, a fan rotatable with said wheel, adjacent to said opening and adapted to expel air in said casing outwardly through said opening, a saw supporting structure carried by said base including a slidable plate mounted on said structure and movable in a plane transversely relative to the plane of rotation of said wheel, clamping means on said plate for securing a saw thereon with its teeth in the direction of said wheel, and manually operable saw tooth locating means carried by said supporting structure, said casing having a slotted area radially of said wheel in a plane coincident with the plane of sliding movement of said plate and exposing said wheel for contact with a saw tooth.

3. In combination, a base, a power driven grinding wheel rotatably carried by said base, a saw supporting structure carried by said base including a slidable plate mounted on said structure and movable to-and-fro in a plane extending radially relative to the axis of rotation of said wheel, a threaded stud secured to said plate and projecting vertically relative to said plane and having an annular flange adjacent to said plate receivable in a centrally located aperture of a circular saw, a clamping washer and nut threaded on said stud for clamping a circular saw on said plate, a saw tooth locating pin carried by said structure and movable to a first position for engagement with either of the teeth of said saw and located between said wheel and plate, whereby contact between said wheel and saw is prevented during saw tooth locating operations, said pin normally biased to a second position out of the path of movement of said plate, and manually operable means for controlling the movement of said pin and including means for latching said pin in said first position.

4. In combination, a base, a power driven grinding wheel rotatably carried by said base, a saw supporting structure including a slidable plate mounted on said supporting structure and movable in a plane transversely relative to the plane of rotation of said wheel, a secondary plate swingably mounted on said slidable plate, pivot means on said slidable plate engaging said secondary plate and including clamping means engageable with said secondary plate for securing said secondary plate in any one of a plurality of positions relative to said pivot means, a threaded stud secured to said secondary plate laterally of said pivot means and projecting vertically of said secondary plate, said stud having an annular flange adjacent to said secondary plate receivable in a centrally located aperture of a circular saw, a clamping washer and nut threaded on said stud for clamping a circular saw on said secondary plate, a saw tooth locating pin carried by said supporting structure and movable to a first position for engagement with either of the teeth of said saw and normally biased to a second position out of the path of movement of said sliding and secondary plates, and manually operable means for controlling said pin and including latching means for holding said pin in said first position.

5. In a circular saw tooth grinding apparatus, in combination, a saw supporting structure including a first saw supporting plate slidable thereon, said first plate having means for removably mounting a hub on said first plate for rotatably supporting a circular saw thereon, said first plate including means for pivotally mounting a second saw supporting plate thereon for swinging movement in a plane parallel to the plane of movement of said first plate, a saw tooth locating pin carried by said structure and movable alternatively to a first and second position for engagement with the teeth of a circular saw mounted on either of said first and second plates, said pin normally biased to a third position out of the path of sliding movement of said first plate, and manually operable means for controlling said pin including adjustable latching means for holding said pin in either of said first and second positions.

6. In a circular saw tooth grinding apparatus, in combination, a saw supporting structure, including a first saw supporting plate slidable thereon and having means for removably mounting a hub and clamping means thereon for rotatably supporting a circular saw, pivot means carried by said first plate laterally of said first mentioned means, a second saw supporting plate swingable on said pivot means in a plane parallel to the plane of movement of said first plate, said pivot means including clamping means for securing said second plate in either of a plurality of positions relative to the axis of said pivot means, a hub mounted on said second plate laterally of said pivot means for rotatably supporting a circular saw on said second plate and including clamping means for holding said saw against rotation, a saw tooth locating pin carried by said structure and movable alternatively to a first and second position for engagement with the teeth of a circular saw when mounted on either of said first and second plates, said pin normally biased to a third position out of the path of movement of said first plate, and manually operable means for controlling said pin and including adjustable latching means for holding said pin in either of said first and second positions.

7. In a saw tooth grinding apparatus, in combination, a base, a rotatable grinding wheel carried by said base, a saw supporting structure carried by said base, a saw supporting plate slidably carried by said structure for movement in a plane transversely relative to the plane of rotation of said wheel and including means for rotatably mounting a saw on said plate parallel to the plane of movement thereof, means carried by said plate for clamping said saw against rotation, said plate movable in said plane of movement thereof in either of two directions radially relative to the axis of said wheel, stop means limiting movement of said plate in either of said two directions, one of said stop means being adjustable in either of said two directions to-and-fro relative the axis of said wheel and situated adjacent to said grinding wheel for limiting the movement of said plate toward the axis of said wheel and determining the depth of grind on the teeth of said saw and the uniformity of the depth of grind as to each of the saw teeth, the other of said stop means having a fixed position limiting the movement of said plate away from said axis and manually operable saw tooth locating means carried by said structure for orienting each tooth of said saw relative to said grinding wheel, said locating means normally biased to an inoperative position and including latching means for retaining said locating means in tooth engaging position.

8. A saw sharpening apparatus including a portable base plate having a flat table portion and a power driven grinding wheel mounted on said base and rotatable in a plane normal to the plane of said table portion in combination with a saw supporting plate slidably mounted on said table portion in the plane of said table portion, said last mentioned plane being disposed substantially radially of the axis of rotation of said wheel, guiding means interacting between said table portion and supporting plate and limiting the movement of said supporting plate to either of two directions to-an-fro relative to said axis of rotation, stop means on said table portion engageable with said supporting plate and limiting sliding movement of said supporting plate in a direction away from said axis, clamping means on said supporting plate including a pivot post whereby a circular saw may be mounted on said supporting plate in pivotal relation to said post and fixedly secured against pivotal movement, a saw tooth locating pin carried by said table portion and manually projectable through said portion normal to the plane of said portion to a position disposed between said wheel and supporting plate and the periphery of said saw, said pin biased for movement in the opposite direction, said wheel having a beveled periphery and said pin disposed directly radially of said periphery for movement adjacent and parallel to a plane coinciding with the leading margin of said edge, whereby the pin directly engages and locates the tooth to be ground in relation to the wheel.

9. A saw sharpening apparatus including a base plate, a saw supporting structure mounted on said base, and a power driven grinding wheel rotatably carried by said base plate adjacent said structure, in combination with a saw supporting plate slidably mounted on said structure and movable to-and-fro in a first plane parallel to and radially relative to the axis of rotation of said wheel, a pivot carried by said supporting plate and extending vertically relative to said first plane, a secondary saw supporting plate mounted on said pivot for angular adjustment on said slidable plate, a first clamping means for securing said secondary plate in adjusted position on said supporting plate, a second clamping means on said secondary plate for securing a circular saw thereto with its teeth in a second plane parallel to said first plane, and manually operable saw tooth locating means carried by said supporting structure movable vertically relative to said first plane to a position disposed between the periphery of said wheel and said saw, whereby the tooth to be ground is engaged by said locating means and set in position for engagement with said wheel.

10. A saw sharpening apparatus including a base member, a stationary plate mounted on said base and disposed in a given plane, and a power driven grinding wheel carried by said base and rotatable in a second plane normal to said given plane, the axis of rotation of said wheel being substantially disposed in and parallel to said given plane, in combination with a saw supporting plate mounted on said stationary plate and slidable in said second plane to-and-fro relative to said wheel, saw clamping means on said supporting plate for securing a saw thereto with its teeth disposed in a third plane parallel to said given plane, and a manually operable saw tooth locating pin carried by said base member and movable through said stationary plate in a vertical direction relative thereto to a position disposed between the periphery of said wheel and a saw when mounted on said supporting plate, said pin retractable subsequent to saw tooth aligning operations and preventing engagement between said saw and grinding wheel when in saw tooth aligning position.

11. A saw sharpening apparatus including a portable base, a supporting table fixedly mounted on said base, a bearing support slidably mounted on said base, means for manually sliding said support on said base in a plane paralleling the plane of said table and including manually operable clamping means securing said support to said base, and a power driven grinding wheel journaled in said support and rotatable in a plane normal to said plane of said table, in combination with a saw supporting plate slidable on said table including guide means confining the plate to sliding movement in the plane of said table directly to-and-fro in a radial direction relative to the axis of rotation of said wheel, manually operable clamping means on said supporting plate for securing a saw thereto with its teeth disposed for engagement with said wheel and in a plane paralleling the plane of said table, a saw tooth locating pin movably carried by said table and projectible therethrough to a position for engagement with a saw tooth and disposed between said wheel and supporting plate during saw tooth locating operation, manual means carried by said table operative to move said pin to tooth locating position, said pin being biased to a position out of the plane of movement of said supporting plate, and latching means manually engageable with said manual means when said pin is in tooth locating position to retain said pin therein during tooth locating operations.

References Cited in the file of this patent

UNITED STATES PATENTS

| | | |
|---|---|---|
| 315,715 | Bush | Apr. 14, 1885 |
| 330,399 | Herhold et al. | Nov. 17, 1885 |
| 360,679 | Gaskin | Apr. 5, 1887 |
| 579,837 | Parsons | Mar. 30, 1897 |
| 1,087,107 | Conrad | Feb. 17, 1914 |
| 1,117,595 | Oatley | Nov. 17, 1914 |
| 1,135,245 | Zuleg | Apr. 13, 1915 |
| 2,347,087 | Deyarmond | Apr. 18, 1944 |
| 2,436,004 | Hall | Feb. 17, 1948 |
| 2,742,799 | Oller | Apr. 24, 1956 |
| 2,764,043 | Daggett | Sept. 25, 1956 |
| 2,808,743 | Hamberger | Oct. 8, 1957 |